United States Patent [19]

Eger

[11] Patent Number: 4,469,368

[45] Date of Patent: Sep. 4, 1984

[54] PASSENGER CAR BODY STRUCTURE

[75] Inventor: Georg Eger, Pleidelsheim, Fed. Rep. of Germany

[73] Assignee: Dr. Ing. h.c.F. Porsche Aktiengesellschaft, Stuttgart, Fed. Rep. of Germany

[21] Appl. No.: 361,797

[22] Filed: Mar. 25, 1982

[30] Foreign Application Priority Data

Apr. 9, 1981 [DE] Fed. Rep. of Germany ....... 3114379

[51] Int. Cl.³ ............................................. B62D 21/00
[52] U.S. Cl. .................................. 296/188; 180/89.1; 280/785; 296/194
[58] Field of Search ............... 296/188, 189, 193, 194; 280/781, 785; 180/89.1

[56] References Cited

U.S. PATENT DOCUMENTS

| | | | |
|---|---|---|---|
| 3,044,822 | 7/1962 | Dean | 296/194 |
| 3,409,098 | 11/1968 | Brueder | 280/781 |
| 3,819,224 | 6/1974 | Casey | 296/189 |
| 3,827,525 | 8/1974 | Felzer | 296/189 |
| 4,183,574 | 1/1980 | Klie | 296/188 |
| 4,186,957 | 2/1980 | Lutze | 296/188 |
| 4,188,059 | 2/1980 | Bauer | 296/188 |
| 4,189,177 | 2/1980 | Schwuchow | 296/188 |

Primary Examiner—Bruce H. Stoner, Jr.
Assistant Examiner—John A. Carroll
Attorney, Agent, or Firm—Craig & Burns

[57] ABSTRACT

A body structure in which a transverse wall, that bounds an end of a vehicle passenger compartment, is extended to fender walls and is provided with shock absorber mounts, two upper and lower longitudinal bearers and a floor plate being attached to the transverse wall and the fender walls. To provide high rigidity, the top of the transverse wall has a parallel reinforcing element which interconnects opposite shock absorber mounts and the upper longitudinal bearers. At the bottom of the transverse wall, there is provided a frame system consisting of hollow members formed by the transverse wall and the bottom plate, and by reinforcing elements connecting the longitudinal bearers to the floor plate and a support element.

2 Claims, 6 Drawing Figures

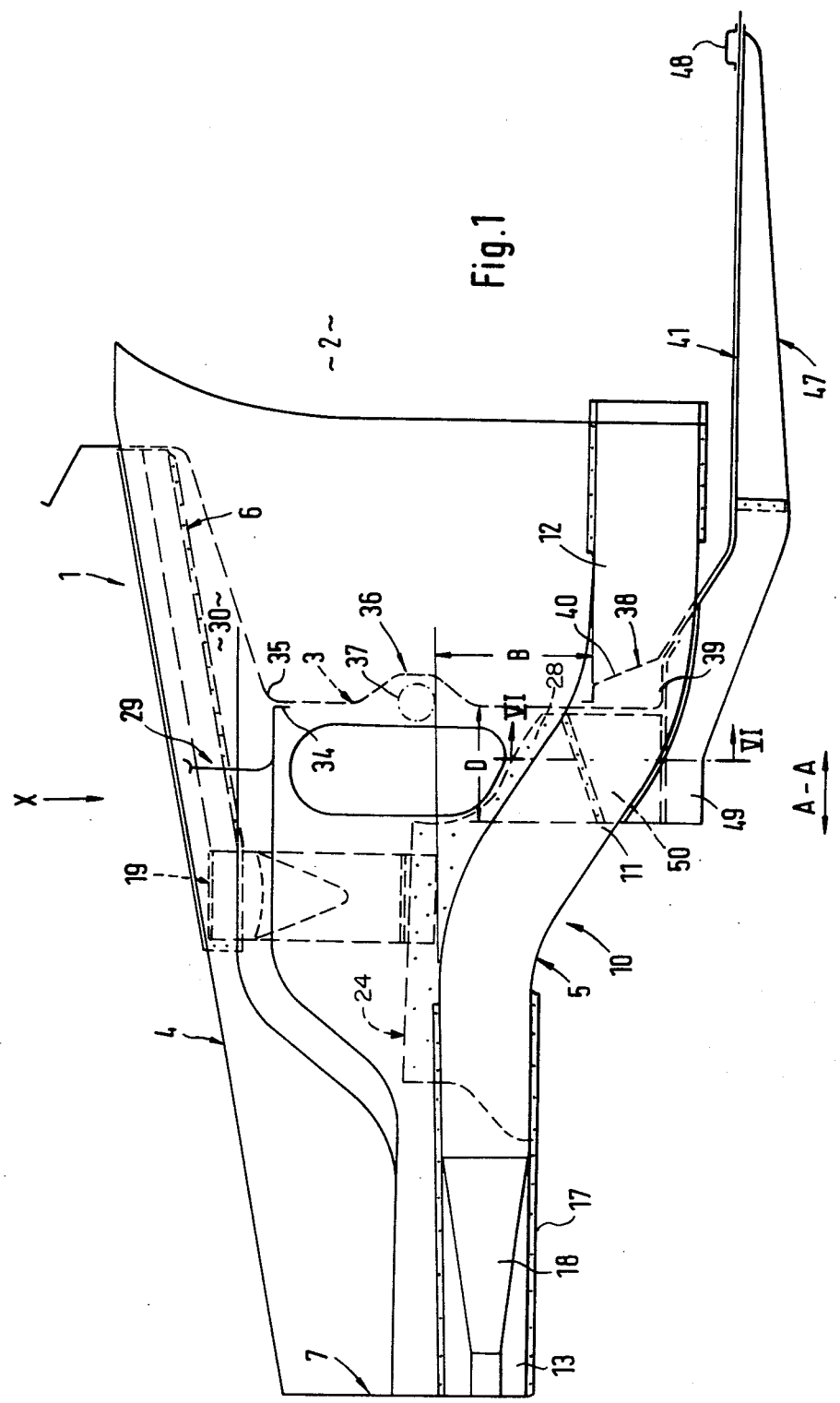

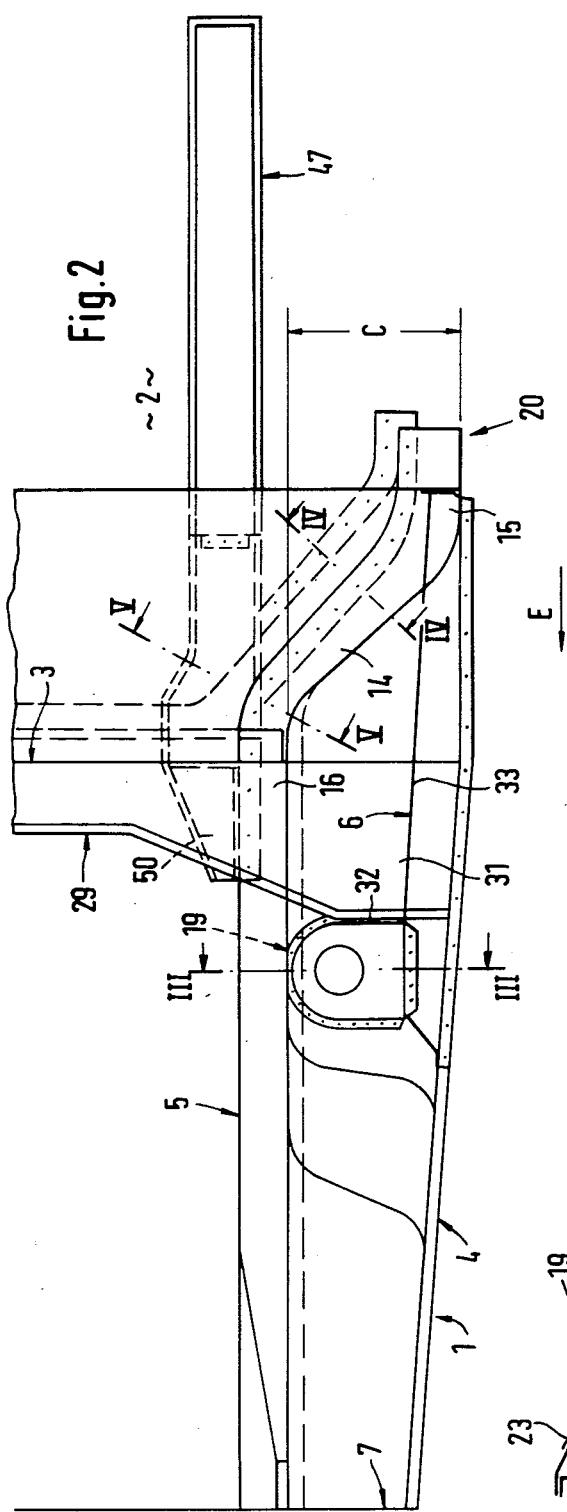

PASSENGER CAR BODY STRUCTURE

BACKGROUND AND SUMMARY OF THE INVENTION

The invention relates to a passenger car body structure in which a transverse wall limiting the passenger compartment extends to fender walls which are provided with shock absorber mounts and longitudinal supports, and a bottom plate is attached directly to the transverse wall and indirectly to the fender walls.

In a known body structure (German Patent Application—Offenlegungsschrift 2,450,763) of this kind, shock absorber mounts are simply and indirectly connected to a transverse wall of the car body structure by the fender walls, so that loads developing while the vehicle is in motion can result in undesirable torsions and bends in the structure. Besides, the longitudinal supports and the bottom plate of the body structure are assembled at the bottom of the transverse wall in such a manner that the requirements for a rigid passenger compartment are difficult to meet with this structure.

A principal object of the invention is, therefore, to arrange the body structure, in the vicinity of a transverse end wall limiting the passenger compartment, so as to provide for a rigid passenger compartment, and also to absorb loads so that no troublesome torsional or bending stresses develop.

According to a preferred embodiment of the invention, this object is achieved through the provision of a transverse end wall of the passenger compartment with a parallel reinforcing element at its top which connects the transverse wall to opposite shock absorber mounts and to upper longitudinal supports, as well as a frame system of hollow elements at its bottom, the frame system being formed by portions of the transverse end wall, longitudinal bearers and a floor plate, as well as reinforcing members.

The principal advantages obtained from the invention are that the shock absorber mounts, the reinforcing element, which connects the upper longitudinal supports, and the frame system at the bottom of the transverse wall provide a rigid passenger compartment and substantially prevent undesirable torsional and bending stresses, especially near the shock absorber mounts and in a portion of the structure located further forward and possibly used to accommodate wheel steering members. Shock absorber mount extensions in the from of reinforcements, the reinforcing shape of the transverse wall, and the hollow members located at the bottom of the body structure contribute to this purpose.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a side view of the body structure of the invention;
FIG. 2 is a view in the direction of arrow X in FIG. 1;
FIG. 3 is a section along line III—III in FIG. 2;
FIG. 4 is a section along line IV—IV in FIG. 2;
FIG. 5 is a section along line V—V in FIG. 2; and
FIG. 6 is a section along line VI—VI in FIG. 1.

DETAILED DESCRIPTION OF THE PREFERRED EMBODIMENT

A body structure 1 in a passenger car (not represented) consists substantially of a transverse wall 3, forming an end wall of a passenger compartment 2, and fender walls 4 extending in the longitudinal direction A—A of the vehicle. Each fender wall 4 is provided with a lower longitudinal bearer 5 and an upper longitudinal bearer 6.

The front end 7 of lower longitudinal bearer 5 is in contact with a body end wall (not shown). Additionally, as represented (FIG. 3) by an outer portion 8 of fender wall 4 and an inner portion 9, longitudinal bearer 5 forms a hollow element.

In FIG. 1, longitudinal bearer 5 has, at 10, a first S-shaped bend, so that the rear portion 12 of bearer 5, adjacent to passenger compartment 2, is lower (distance B) near transverse wall 3 than, for example, at a portion 13 thereof which lies near front end 7.

FIG. 2 shows that longitudinal bearer 5 has another S-shaped bend 14 which begins substantially at transverse wall 3 and extends, proceeding in a direction opposite the direction of travel E, laterally toward the outside of the vehicle. The resulting portions 15, 16 of the bearer 5 are separated by a distance C.

In addition, longitudinal bearer 5 has, at 17 (FIG. 1), a deformation zone 18 which begins at front end 7 and becomes effective when frontal impacts at a speed of approximately 8 km/hr are experienced.

Upper longitudinal bearer 6 extends between a shock absorber mount 19 and a hinged post (not shown) located approximately at 20. Longitudinal bearer 6 is formed by a portion 21 of fender wall 4 and an angle member 22, which is in contact with a flange 23 of shock absorber mount 19 (FIG. 3).

Shock absorber mount 19 is provided with an extension 24 which extends longitudinally within longitudinal bearer 5. Said extension is attached to fender wall 4 and continues between flanges 25 and 26 as a reinforcement 28 having a shaped portion 27 (FIG. 3).

A reinforcing element 29 (FIGS. 2 and 3), having an angular cross section, defines a unit space 30 and extends parallel to transverse wall 3. At each end, near a respective shock absorber mount 19, reinforcing element 29 has an expansion 31, and is connected at 32 to said mount and at 33 to longitudinal bearer 6.

Reinforcing element 29, by way of a flange 34 thereof (FIG. 2), is in contact with a bent portion 35 of transverse wall 3, which also defines unit space 30. Spaced from said bent portion 35, transverse wall 3 has a reinforcing portion 36 extending transversely relative to the longitudinal axis of the vehicle. Portion 36 is cross-sectionally of a toothlike shape (FIG. 1), and is shaped to accommodate a steering gear 37.

A transverse member 38 (FIG. 1), formed by a bend 39 in transverse wall 3 and an edge deformation 40 in a floor plate 41, is provided at the bottom of transverse wall 3 (FIG. 1). Edge deformation 40 imparts to bottom plate 41 a troughlike configuration, at least in its front portion.

Edge deformation 40 extends parallel to bend 14 in longitudinal bearer 5 so that, together with bearer 5 and a reinforcing element 42, the deformation 40 forms a frame system comprising two hollow members 43 and 44 (FIG. 4). Reinforcing member 42 connects the bottom faces 45 and 46, located approximately in a common plane, of longitudinal bearer 5 and floor plate 41.

On its side oriented toward the roadway, floor plate 41 has a support element 47, of a hatlike cross section, mounted thereto so as to function similar to a longitudinal bearer. The element 47 begins at a transverse member 48 located in passenger compartment 2 and extends beyond transverse wall 3 (distance D, FIG. 1). A junction plate 50 is provided between transverse wall 3 and a projection portion 49 of support element 47.

As shown in FIG. 6, junction plate 50 is in contact with the inner side 51 of support element 47, extends obliquely upward, and is connected at 52 to longitudinal bearer 5. This structure and the connection of the outer side 53 of support element 47 to longitudinal bearer 5, substantially in line with support portion 9, determine the formation of two additional parallel hollow members 54 and 55 which reinforce body structure 1 at different levels. As shown in FIG. 1, reinforcement 28 may extend at least throughout this longitudinal support section.

A comparable structure is represented in FIG. 5. In this case, support element 47 and the edge deformation 40 of bottom plate 41 are used to form hollow members 56 and 57.

From the foregoing, it can be seen that the body structure according to the present invention is effectively strengthened and rigidified in its area in the vicinity of the shock absorber mounts and passenger compartment transverse end wall. Thus, increased safety is afforded passengers with the passenger compartment 2, and loads, developing while the vehicle is traveling and transmitted by the shock absorbers, can be absorbed without troublesome torsional or bending stresses being created. Additionally, since these benefits are achieved through shaping of sheet-like panel members, instead of through rigid beams, vehicle weight reduction efforts are not unduely compromised.

While I have shown and described a single embodiment in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A passenger car body structure comprising upper and lower longitudinal bearers, fenders, each of which being provided with a shock absorber mount and being connected to respective upper and lower longitudinal bearers, a transverse wall forming an end wall of a passenger compartment of the car, the transverse wall extending, at opposite ends thereof, to said fenders, a floor plate being attached directly to the transverse wall and indirectly to a wall of each fender, the transverse wall being provided at its top with a parallel reinforcing element, said parallel reinforcing element interconnecting the transverse wall with the shock absorber mounts of the fender walls and the upper longitudinal bearers, a frame system consisting of hollow members being provided at the bottom of the transverse wall, the hollow members of said frame system being formed by portions of the transverse wall, the floor plate, longitudinally extending floor plate support elements, and reinforcing members, and each reinforcing member being connected to the floor plate and a respective one of the lower longitudinal bearers and further comprising the shock absorber mounts being provided with a vertical extension having a reinforcement which extends vertically within the lower longitudinal bearers.

2. A passenger car body structure comprising upper and lower longitudinal bearers, fenders, each of which being provided with a shock absorber mount and being connected to respective upper and lower longitudinal bearers, a transverse wall forming an end wall of a passenger compartment of the car, the transverse wall extending, at opposite ends thereof, to said fenders, a floor plate being attached directly to the transverse wall and indirectly to a wall of each fender, the transverse wall being provided at its top with a parallel reinforcing element, said parallel reinforcing element interconnecting the transverse wall with the shock absorber mounts of the fender walls and the upper longitudinal bearers, a frame system consisting of hollow members being provided at the bottom of the transverse wall, the hollow members of said frame system being formed by portions of the transverse wall, the floor plate, longitudinally extending floor plate support elements, and reinforcing members, each reinforcing member being connected to the floor plate and a respective one of the lower longitudinal bearers, and the transverse wall being cross-sectionally provided with a reinforcing portion shaped to accommodate a unit such as a steering gear.

* * * * *